US007152122B2

(12) United States Patent
Kagan et al.

(10) Patent No.: US 7,152,122 B2
(45) Date of Patent: Dec. 19, 2006

(54) QUEUE PAIR CONTEXT CACHE

(75) Inventors: Michael Kagan, Zichron Yaakov (IL); Diego Crupnicoff, Haifa (IL); Benny Koren, Zichron Yaakov (IL); Matan Milo, Benyamina (IL); Ariel Shachar, Haifa (IL)

(73) Assignee: Mellanox Technologies Ltd., Yokneam (IL)

( * ) Notice: Subject to any disclaimer, the term of this patent is extended or adjusted under 35 U.S.C. 154(b) by 602 days.

(21) Appl. No.: 10/052,413

(22) Filed: Jan. 23, 2002

(65) Prior Publication Data

US 2002/0184446 A1    Dec. 5, 2002

Related U.S. Application Data

(60) Provisional application No. 60/283,018, filed on Apr. 11, 2001.

(51) Int. Cl.
G06F 15/16    (2006.01)
G06F 15/173   (2006.01)

(52) U.S. Cl. ..................... 709/250; 709/243

(58) Field of Classification Search ............... 709/213, 709/230–237, 238–250, 200; 711/118, 228; 707/7; 370/389, 412
See application file for complete search history.

(56) References Cited

U.S. PATENT DOCUMENTS 5,509,123 A * 4/1996 Dobbins et al. ............ 709/243

6,360,220 B1 * 3/2002 Forin ............................. 707/8
6,389,479 B1 * 5/2002 Boucher et al. ............ 709/230
6,807,581 B1 * 10/2004 Starr et al. ................. 709/250
2001/0037406 A1 * 11/2001 Philbrick et al. ........... 709/250

OTHER PUBLICATIONS

Welsh et al., Memory management for user-level network interface, IEEE Micro, vol. 18, issue 2, Mar.-Apr. 1998, pp. 77-82.*
The InfiniBand Architecture Specification, Release 1.0, Oct. 2000. (Available at: www.infinibandta.org.) pp. 58-69 and 215-218.
The IBM PCI-X to InifiniBand Host Channel Adapter, Produced by IBM Microelectronics Division, Hopewell Junction, New York, Oct. 2000.

* cited by examiner

*Primary Examiner*—Andrew Caldwell
*Assistant Examiner*—Kelvin Lin
(74) *Attorney, Agent, or Firm*—Mark M. Friedman

(57) ABSTRACT

A network interface adapter includes a network interface, coupled to send and receive data packets over a network and a host interface, for coupling to a host processor and to a system memory associated therewith. The system memory contains context information with respect to a plurality of transport service instances used to send and receive the data packets over the network, each of the data packets belonging to a respective one of the service instances. Packet processing circuitry, coupled between the network interface and the host interface, processes the data packets using the context information of the respective service instances. A cache memory associated with the packet processing circuitry is coupled to load from the system memory and store the context information of the respective transport service instances for the data packets being processed by the packet processing circuitry.

37 Claims, 4 Drawing Sheets

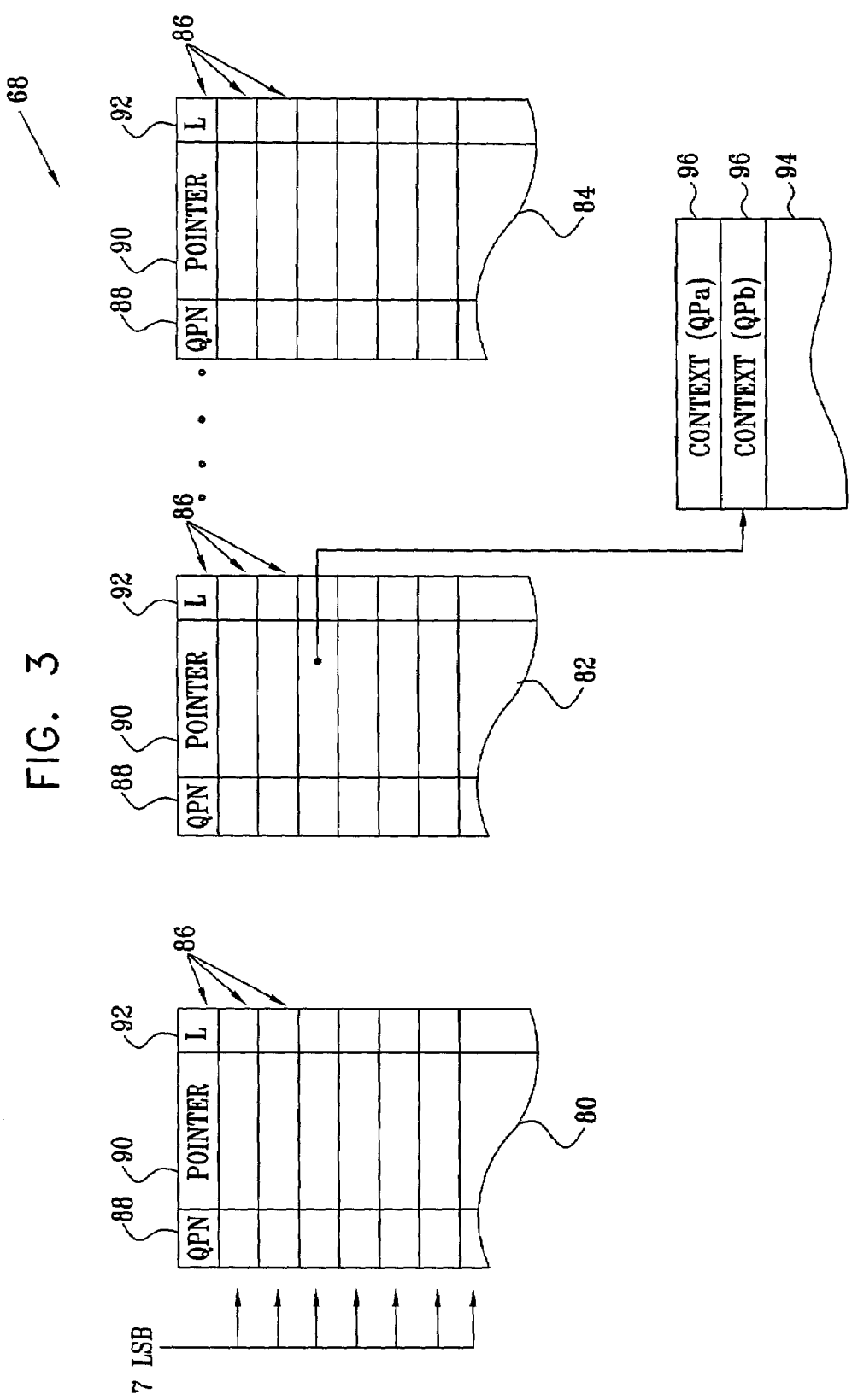

QUEUE PAIR CONTEXT CACHE

CROSS-REFERENCE TO RELATED APPLICATION

This application claims the benefit of U.S. Provisional Patent Application No. 60/283,018, filed Apr. 11, 2001, which is incorporated herein by reference.

FIELD OF THE INVENTION

The present invention relates generally to digital network communications, and specifically to network adapters for interfacing between a host processor and a packet data network.

BACKGROUND OF THE INVENTION

The computer industry is moving toward fast, packetized, serial input/output (I/O) bus architectures, in which computing hosts and peripherals are linked by a switching network, commonly referred to as a switching fabric. A number of architectures of this type have been proposed, culminating in the "InfiniBand™" (IB) architecture, which has been advanced by a consortium led by a group of industry leaders (including Intel, Sun Microsystems, Hewlett Packard, IBM, Compaq, Dell and Microsoft). The IB architecture is described in detail in the *Infiniband Architecture Specification,* Release 1.0 (October, 2000), which is incorporated herein by reference. This document is available from the InfiniBand Trade Association at www.infinibandta.org.

A host processor (or host) connects to the IB network via a network interface adapter, which is referred to in IB parlance as a host channel adapter (HCA). Typically, the HCA is implemented as a single chip, with connections to the host bus and to the network. Client processes running on the host communicate with the transport layer of the IB fabric by manipulating a transport service instance, known as a "queue pair" (QP), made up of a send work queue and a receive work queue. The IB specification permits the HCA to allocate as many as 16 million ($2^{24}$) QPs, each with a distinct queue pair number (QPN). A given client may open and use multiple QPs simultaneously.

To send and receive communications over the network, the client initiates work requests (WRs), which causes work items, called work queue elements (WQEs), to be placed onto the appropriate queues. The channel adapter then executes the work items, so as to communicate with the corresponding QP of the channel adapter at the other end of the link. After it has finished servicing a WQE, the HCA writes a completion queue element (CQE) to a completion queue, to be read by the client.

The QP that initiates a particular operation, i.e. injects a message into the fabric, is referred to as the requester, while the QP that receives the message is referred to as the responder. An IB operation is defined to include a request message generated by the requester and, as appropriate, its corresponding response generated by the responder. (Not all request messages have responses.) Each message consists of one or more IB packets. Typically, a given HCA will serve simultaneously both as a requester, transmitting requests and receiving responses on behalf of local clients, and as a responder, receiving requests from other channel adapters and returning responses accordingly. Request messages include, inter alia, remote direct memory access (RDMA) write and send requests, all of which cause the responder to write data to a memory address at its own end of the link, and RDMA read requests, which cause the responder to read data from a memory address and return it to the requester. Atomic read-modify-write requests can cause the responder both to write data to its own memory and to return data to the requester. Most response messages consist of a single acknowledgment packet, except for RDMA read responses, which may contain up to $2^{31}$ bytes of data, depending on the data range specified in the request.

To generate an outgoing message or service an incoming message on a given QP, the HCA uses context information pertaining to the QP. The QP context is created in a memory accessible to the HCA by the client process that sets up the QP. The client configures the QP context with fixed information such as the destination address (referred to as the LID—local identifier), negotiated operating limits, service level and keys for access control. Typically, a variable part of the context, such as the current packet sequence number (PSN) and information regarding the WQE being serviced by the QP, is subsequently updated by the HCA as it sends and receives messages. For example, to service an incoming packet on a reliable (acknowledged) connection, the HCA reads the packet transport header, which identifies the target QP, and uses the context of that QP to verify that the packet came from the correct source and that the PSN is valid (no missed packets). For a RDMA write operation on a reliable connection, the HCA reads the WQE and retrieves necessary data from the QP context, such as the destination address, target QP and next PSN. It then accesses the host memory to retrieve the packet data, and sends the packet to the destination.

The IB specification also provides for unconnected and unreliable services, which use the QP context in different ways. (For example, unreliable services typically ignore the PSN, while unconnected services do not maintain a specific target QP as part of the QP context.) In all cases, however, the QP context plays a key role in processing every packet that the HCA must send or receive.

It will be appreciated that the QP context for each pending QP contains a substantial amount of data. Because of the high cost of on-chip memory, it is not possible to provide sufficient memory on the HCA to store context information for all of the 16 million QPs allowed by the IB specification. Therefore, in practical HCA implementations it is necessary to limit the number of QPs supported according to the size of the available on-chip memory or to store QP context information off-chip. For example, the IBM PCI-X to InfiniBand Host Channel Adapter, produced by IBM Microelectronics Division (Hopewell Junction, N.Y.) implements a layered memory structure, in which connection-related information is stored in on-device memory and also, optionally, in off-device memory attached to the HCA. This optional configuration allows the IBM HCA to support up to 16K QPs. There is inevitably a price to be paid for storing context information off-chip, in terms of the time needed by the HCA to access the information when processing incoming and outgoing messages.

SUMMARY OF THE INVENTION

It is an object of some aspects of the present invention to provide devices and methods for interfacing a host processor to a network, while affording enhanced efficiency in accessing context information needed to process incoming and outgoing messages.

It is a further object of some aspects of the present invention to provide a network interface adapter chip that makes optimal use of a small on-chip memory in storing context information for a large number of transport service instances, such as QPs.

In preferred embodiments of the present invention, a HCA comprises a cache memory for holding QP context information. The cache entries contain the context information that the HCA requires for carrying out its current packet sending and receiving functions, i.e., the context of QPs on which the HCA is currently sending or receiving packets or on which it has recently done so. The required context information is loaded into the cache from a much larger store of context information held in off-chip memory, preferably in a system memory associated with the host processor served by the HCA.

The QP context cache preferably comprises an eight-way set-associative cache, although alternative cache structures may also be used. When the HCA receives a WQE or incoming packet for processing, it looks up the corresponding QP number (QPN) in the cache, preferably using a number of the least significant bits of the address as the lookup index. When the QPN matches the target stored in the cache for the given index (i.e., when there is a cache hit), the HCA uses the context information in the cache. It thus saves considerable processing time by avoiding having to read the context information from the off-chip memory. Since it is common in network applications for a sequence of packets to be sent and received on a single QP, the likelihood of a cache hit is high. In the event of a cache miss, the HCA looks up the QPC information in the off-chip memory and, preferably, loads the information into the cache in place of another entry having the same index as the current QPN. Most preferably, one or more flags are associated with each of the cache entries in order to prevent or inhibit replacement of entries that are or may shortly be in active use.

In some preferred embodiments of the present invention, while a cache entry with a certain index is being loaded, the HCA is blocked from accessing cache entries of other QPs having the same index (i.e., in the same row of the cache). QPs having other indices are substantially unaffected. Although both full blocking and non-blocking caches are known in the art, the novel single-row blocking scheme of these preferred embodiments shares certain advantages of both cache types. Blocking only the single cache row avoids errors in reading from the cache during entry loading, but without substantially inhibiting processing speed. This cache access scheme is thus useful not only in the context of the network adapters described herein, but also in other cache applications.

Preferably, one QP context cache is provided for the requester communication flow handled by the HCA, and another is provided for the responder communication flow. Most preferably, each of these caches is used for both sending and receiving packets on the respective flow. In some preferred embodiments of the present invention, the HCA is configured to handle both of these flows using common hardware resources, rather than maintaining separate hardware paths for these functions as in devices known in the art. This novel HCA architecture is described in U.S. patent application publication number 2002/0152327, entitled "Network Interface Adapter with Shared Data Send Resources," filed Dec. 4, 2001 which is assigned to the assignee of the present patent application, and whose disclosure is incorporated herein by reference.

Although the preferred embodiments described herein relate specifically to IB switch fabrics and to HCAs used with such fabrics, the principles of the present invention may similarly be applied, mutatis mutandis, to channel adapters of other types, such as target channel adapters (TCAs), as well as to network interface adapters used in packet networks of other types. Moreover, while the present patent application describes certain preferred schemes for managing the QP context cache, other cache management methods, as are known in the art, may also be used in manipulating the QP context information.

There is therefore provided, in accordance with a preferred embodiment of the present invention, a network interface adapter, including:

a network interface, coupled to send and receive data packets over a network;

a host interface, for coupling to a host processor and to a system memory associated therewith, the system memory containing context information with respect to a plurality of transport service instances used to send and receive the data packets over the network, each of the data packets belonging to a respective one of the service instances;

packet processing circuitry, coupled between the network interface and the host interface, and adapted to process the data packets using the context information of the respective service instances; and a cache memory associated with the packet processing circuitry and coupled to load from the system memory and store the context information of the respective transport service instances for the data packets being processed by the packet processing circuitry.

Preferably, the transport services instances have respective instance numbers, and the cache memory includes one or more tables having entries indicating the context information of the respective transport service instances, indexed by a portion of the service instance numbers. Most preferably, the portion of the instance numbers includes a predetermined number of the least significant bits of the instance numbers. Further preferably, the one or more tables include at least two tables.

Additionally or alternatively, the entries include respective target fields, corresponding to at least a segment of the service instance numbers of the service instances to which the entries belong, and the target fields are compared to the segment of the service instance numbers of the data packets to determine that a cache hit has occurred, whereupon the packet processing circuitry reads the context information from one of the tables.

Preferably, the packet processing circuitry includes a cache controller, which is adapted, responsive to a request from the circuitry to access the context information in the cache memory with respect to one of the service instances, to determine whether a cache hit has occurred, and when the cache hit has not occurred, to read the requested context information from the system memory and load the requested context information into the cache memory in place of the context information of another one of the service instances. Further preferably, the context information is organized in the cache memory using a plurality of tables having entries referenced by respective indices, and the cache controller is adapted, while reading the requested context information from the system memory for one of the service instances having a given one of the indices, to block access by the packet processing circuitry to the context information of the service instances having the given one of the indices, while enabling the packet processing circuitry to access the context information of the service instances with other indices.

Additionally or alternatively, the cache controller is adapted, responsive to the request to access the context information, to set a flag with respect to the service instance for which the context information is requested indicating that the context information is in use, and the cache controller is further adapted, upon loading the context information into the cache memory, to store the loaded context information in the cache in place of the context information of another one of the service instances whose flag is not set.

Preferably, the context information loaded into the cache memory includes one or more fields that are updated by the packet processing circuitry in the course of processing the data packets, and the updated fields are copied back to the context information in the system memory after the data packets have been processed. Most preferably, the context information, in the system memory is updated only when the corresponding entry in the cache is replaced by a new one, using a "write-back" cache methodology. Further preferably, the updated fields include packet serial numbers of packets processed by the circuitry.

In a preferred embodiment, the context information stored in the cache memory includes a send cache, containing the context information pertaining to packets generated responsive to requests submitted by the host processor, and a receive cache, containing the context information pertaining to packets generated responsive to requests submitted to the adapter by remote entities over the network.

Preferably, the packet processing circuitry includes an outgoing packet generator, adapted to generate the packets for delivery to remote entities via the network, and an incoming packet processor, coupled to receive and process the packets from the remote entities via the network, wherein both the outgoing packet generator and the incoming packet processor are coupled to access the same context information in the cache memory. Further preferably, the outgoing packet generator is adapted to generate the packets for delivery to the remote entities responsive both to outgoing requests submitted by the host processor via the host interface and to incoming requests conveyed by the packets received from the remote entities. Most preferably, the incoming packet processor is adapted to process both the packets that are received from the remote entities responsive to the outgoing requests conveyed by the packets delivered to the remote entities and the packets that are received from the remote entities conveying the incoming requests.

In a preferred embodiment, the transport service instances includes queue pairs, which are used to interact with a transport layer of the network.

There is also provided, in accordance with a preferred embodiment of the present invention, a method for network communications, including:

coupling a network adapter having a cache memory between a host processor and a network;

storing context information in a system memory associated with the host processor, the context information relating to a plurality of transport service instances for use in sending and receiving data packets over the network via the adapter, each of the data packets belonging to a respective one of the service instances;

responsive to the use of a subset of the transport service instances to send and receive the data packets, loading into the cache memory the context information relating to the transport service instances in the subset; and processing the data packets using the adapter based on the context information in the cache memory.

There is additionally provided, in accordance with a preferred embodiment of the present invention, a host channel adapter, including:

a fabric interface, coupled to send and receive data packets over a switch fabric;

a host interface, for coupling to a host processor and to a system memory associated therewith, the system memory containing context information with respect to a plurality of queue pairs, each of the data packets belonging to a respective one of the queue pairs;

packet processing circuitry, coupled between the fabric interface and the host interface, and adapted to process the data packets using the context information of the respective queue pairs; and a cache memory associated with the packet processing circuitry and coupled to load from the system memory and store the context information of the respective queue pairs for the data packets being processed by the packet processing circuitry.

Preferably, the packet processing circuitry includes an execution unit, adapted to generate the packets for delivery to remote entities via the network, and a transport check unit, coupled to process the packets received from the remote entities via the network, wherein both the execution unit and the transport check unit are coupled to access the same context information in the cache memory. Further preferably, the execution unit is adapted to generate the packets for delivery to the remote entities responsive both to work queue entries submitted by the host processor via the host interface and to incoming requests conveyed by the transport check unit to the execution unit, in response to the packets received from the remote entities. Most preferably, the transport check unit is adapted to process both the packets that are received from the remote entities in response to the packets sent over the network responsive to the work queue items and the packets that are received from the remote entities conveying the incoming requests.

There is further provided, in accordance with a preferred embodiment of the present invention, a method for network communications, including:

coupling a host channel adapter having a cache memory between a host processor and a switch fabric;

storing context information in a system memory associated with the host processor, the context information relating to a plurality of queue pairs for use in sending and receiving data packets over the fabric, each of the data packets belonging to a respective one of the queue pairs;

responsive to the use of a subset of the queue pairs to send and receive the data packets, loading into the cache memory the context information relating to the queue pairs in the subset; and processing the data packets using the adapter based on the context information in the cache memory.

There is moreover provided, in accordance with a preferred embodiment of the present invention, data processing apparatus, including:

a multi-way set-associative cache memory, configured to hold multiple cache entries for use by a processor; and a cache controller, coupled to receive a request by the processor to access a desired entry among the multiple entries in the cache memory, the request indicating an index of the desired entry and a target to be matched by the desired entry, the cache controller being adapted, when none of the entries in the cache memory with the index of the desired entry matches the target, to block access to the entries in the cache memory that share the index of the desired entry while loading the desired entry into the cache from a main memory, and while allowing the processor to access the entries in the cache memory that have indices other than the index of the desired entry.

Preferably, the cache controller is adapted, before blocking the access to the entries in the cache memory that share the index of the desired entry, to complete servicing previous requests by the processor to access the entries in the cache memory that share the index of the desired entry. Additionally or alternatively, the cache controller is adapted, after loading the desired entry into the cache from the main memory, to provide the processor with the access to the desired entry and to unblock the access to the entries in the cache memory that share the index of the desired entry.

Preferably, the request by the processor has an instance number, and the index includes a predetermined portion of the instance number, while the target includes another portion of the instance number. In a preferred embodiment, the instance number includes a queue pair number.

Preferably, each of the entries in the cache has a respective flag that is set to indicate that the entry is in use, and the cache controller is adapted, upon loading the desired entry into the cache from the main memory, to store the desired entry in the cache in place of one of the entries that shares the index of the desired entry and whose flag is not set.

There is furthermore provided, in accordance with a preferred embodiment of the present invention, a method for data processing, including:

receiving a request to access a desired entry in a multi-way set-associative cache memory, configured to hold multiple cache entries, the request indicating an index of the desired entry and a target to be matched by the desired entry;

when the target matches one of the cache entries having the index of the desired entry, providing the requested access to the entry in the cache; and when none of the entries in the cache memory with the index of the desired entry matches the target, blocking access to the entries in the cache memory that share the index of the desired entry while loading the desired entry into the cache from a main memory, and while allowing access to the entries in the cache memory that have indices other than the index of the desired entry.

The present invention will be more fully understood from the following detailed description of the preferred embodiments thereof, taken together with the drawings in which:

BRIEF DESCRIPTION OF THE DRAWINGS

FIG. 3 is a block diagram that schematically illustrates the structure of a QPC cache, in accordance with a preferred embodiment of the present invention.

DETAILED DESCRIPTION OF PREFERRED EMBODIMENTS

Figure 1:
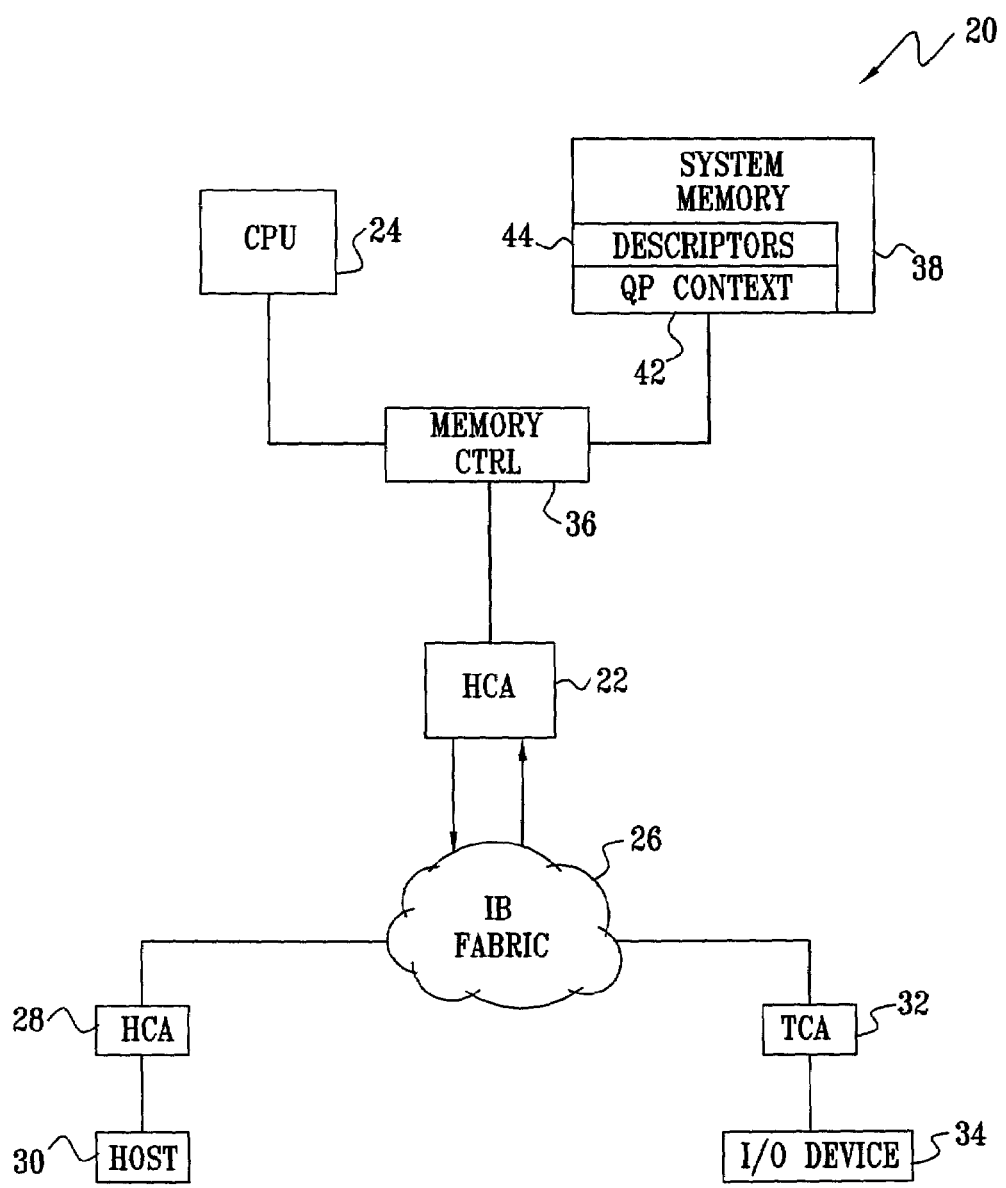
FIG. 1 is a block diagram that schematically illustrates a computer network, in accordance with a preferred embodiment of the present invention.

FIG. 1 is a block diagram that schematically illustrates an IB network communication system 20, in accordance with a preferred embodiment of the present invention. In system 20, a HCA 22 couples a host processor 24 to an IB network (or fabric) 26. Typically, processor 24 comprises an Intel Pentium™ processor or other general-purpose computing device with suitable software. HCA 22 typically communicates via network 26 with other HCAs, such as a remote HCA 28 with a remote host 30, as well as with TCAs, such as a TCA 32 connected to an input/output (I/O) device 34.

Host 24 and HCA 22 are connected to a system memory 38 via a suitable memory controller 36, as is known in the art. The HCA and memory typically occupy certain ranges of physical addresses in a defined address space on a bus connected to the controller, such as a Peripheral Component Interface (PCI) bus. In addition to the host operating system, applications and other data (not shown), memory 38 holds data structures that are accessed and used by HCA 22. These data structures preferably include QP context information 42 maintained by the HCA, and descriptors 44 corresponding to WQEs to be carried out by HCA 22. Certain aspects of the structure and use of QP context information 42 for controlling access to QPs by host processes are described in greater detail in U.S. patent application publication number 2002/0165899 entitled "Multiple Queue Pair Access with a Single Doorbell," filed Nov. 26 ,2001. Descriptors 44 are preferably prepared and executed in the form of a linked list, as described in U.S. patent application publication number 2001/0049755 entitled "DMA Doorbell," filed May 31, 2001. Both of these applications are assigned to the assignee of the present patent application, and their disclosures are incorporated herein by reference.

Figure 2:
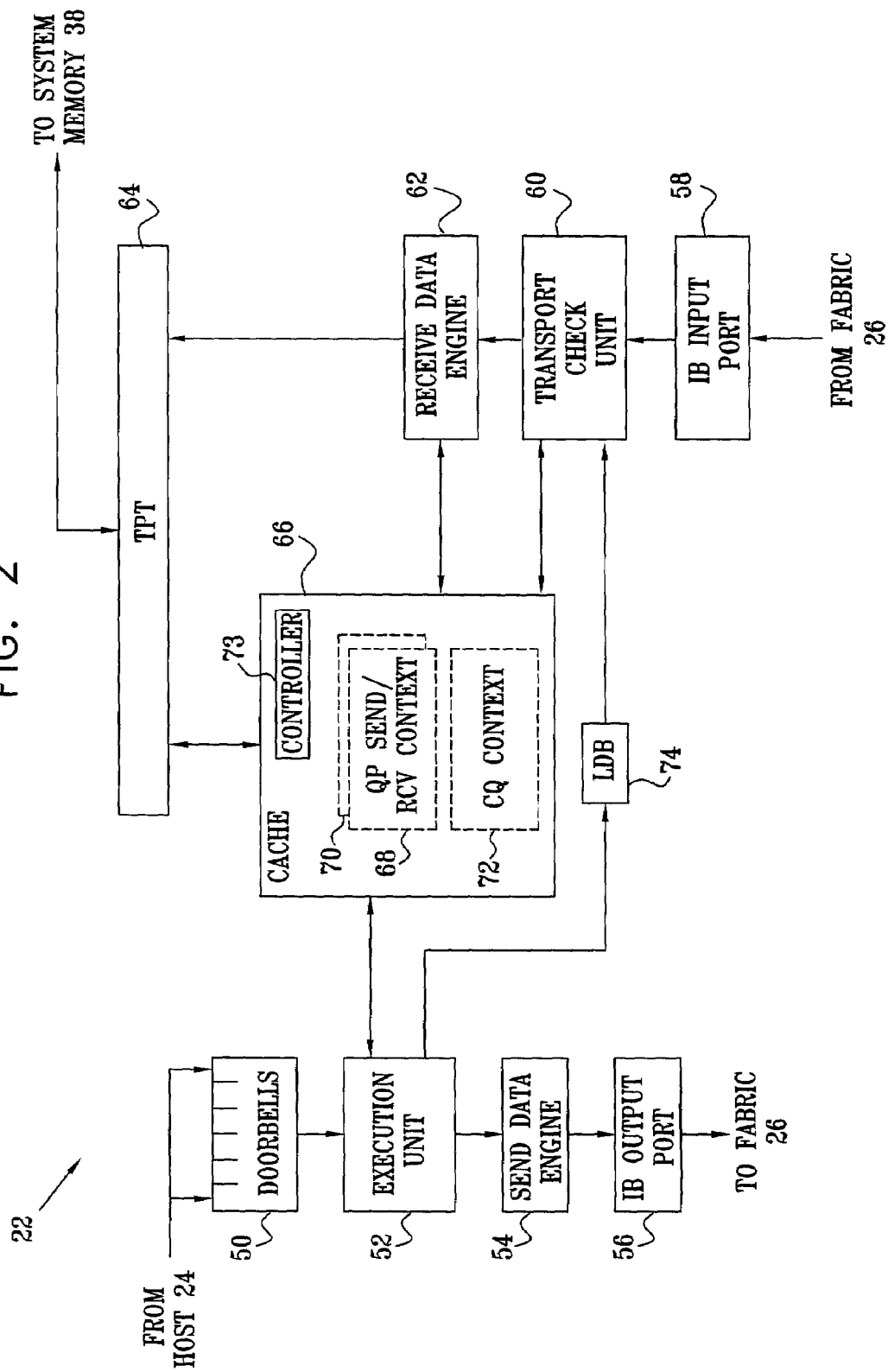
FIG. 2 is a block diagram that schematically shows details of a HCA, in accordance with a preferred embodiment of the present invention.

FIG. 2 is a block diagram that schematically shows details of HCA 22, in accordance with a preferred embodiment of the present invention. The blocks shown in the figure are primarily those that are involved in using and updating QP context information. For the sake of simplicity, elements of HCA 22 that are not essential to an understanding of the present invention are omitted. The blocks and links that must be added will be apparent to those skilled in the art. Further details of the HCA are described in the above-mentioned patent application entitled, "Network Interface Adapter with Shared Data Send Resources," as well as in patent application publication number 2002/0150106 entitled, "Handling Multiple Network Transport Service Levels with Hardware and Software Arbitration," filed Jan. 23, 2002 whose disclosure is incorporated herein by reference.

The various blocks that make up HCA 22 may be implemented either as hardware circuits or as software processes running on a programmable processor, or as a combination of hardware- and software-implemented elements. Although certain functional elements of HCA 22 are shown as separate blocks in the figure for the sake of conceptual clarity, the functions represented by these blocks may actually be carried out by different software processes on a single embedded processor. Preferably, all of the elements of the HCA are implemented in a single integrated circuit chip, but multi-chip implementations are also within the scope of the present invention.

In order to send out packets from HCA 22 on a given QP over network 26, host 24 posts WQEs for the QP by writing descriptors 44 in memory 38 (FIG. 1). For RDMA write and send requests, the descriptors indicate the source of data to be sent and its destination. The data source information typically includes a "gather list," pointing to the locations in memory 38 from which the data in the outgoing message are to be taken. After host 24 has prepared one or more descriptors, it "rings" a doorbell 50 of HCA 22, by writing to a corresponding doorbell address occupied by the HCA in the address space on the host bus. The doorbell thus serves as an interface between host 24 and HCA 22. The process of ringing and servicing doorbell 50 is described in detail in the above-mentioned patent applications.

In response to the doorbell being rung, an execution unit 52 queues the QPs having outstanding WQEs, and schedules the QPs for service by arbitrating among the queues. When a QP reaches the head of its scheduling queue, the execution unit parses each of the WQEs in the linked list belonging to that QP. Based on the WQEs, the execution unit prepares gather entries to submit to a send data engine (SDE) 54. Each gather entry defines a piece of data to be incorporated in a packet to be prepared and sent out by the SDE. SDE 54 gathers the data to be sent from the locations in memory 38 specified by the WQEs and places the data in output packets for transmission over network 26. The data packets prepared by SDE 54 are passed to an output port 56, which performs data link operations and other necessary functions, as are known in the art, and sends the packets out over network 26.

Packets sent to HCA 22 over network 26 are received at an input port 58, which similarly performs data link and buffering functions, as are known in the art. A transport check unit (TCU) 60 processes and verifies transport-layer information contained in the incoming packets, as described in greater detail hereinbelow. When the TCU receives a packet containing data to be written to memory 38, it passes the data to a receive data engine (RDE) 62. The RDE serves as a scatter engine both for RDMA write and send requests received by HCA 22 from remote requesters (such as HCA 28, in FIG. 1) and for RDMA read responses returned to HCA 22 by remote responders (HCA 28 or TCA 32, for example). A translation protection table (TPT) 64 acts as a host interface in HCA 22. It is used for address translation and protection checks to control access to memory 38 by elements of HCA 22, including execution unit 52 and SDE 54, as well as by other, remote entities connected to network 26.

When TCU 60 receives a RDMA read request from a remote requester on a certain QP, it prepares a "quasi-WQE" indicating the required RDMA read response, and places the quasi-WQE in a list belonging to the QP in a response database (not shown in the figures). RDE 62 rings an assigned doorbell to indicate to execution unit 52 that a RDMA read response or other response packet (such as an acknowledge message or atomic operation data) is ready to be sent. Execution unit 52 services this quasi-WQE in much the same way as it services the WQEs generated by client processes on host 24.

In handling doorbell 50, scheduling QPs for processing, reading WQEs from memory 38 and preparing gather entries for SDE 54, execution unit 52 draws on QP context information. The context information enables the execution unit, inter alia, to validate the doorbell, to determine the location in memory 38 from which SDE 54 is to read data to include in outgoing packets, and to fill in the fields of the packet headers. The execution unit requests the necessary QP context information from a cache controller 73, which attempts to read the information from a cache memory 66 on the HCA chip. In the event of a cache miss, the cache controller retrieves the information from memory 38 and loads it into the cache memory for future use. TCU 60 and RDE 62 similarly use the context information from cache memory 66 in processing incoming packets.

Cache memory 66 comprises both a QP send context cache 68 and a QP receive context cache 70. QP send context cache 68 is used for the requester flow of HCA 22 in generating request packets, based on WQEs posted by host 24, and in processing responses to the requests from remote responders on network 26. QP receive context cache 70 is used for the responder flow of HCA 22 in processing requests from remote requesters on the network, and in generating responses to the remote requests. The structure and use of the cache are described in greater detail below.

Although cache controller 73 is shown for simplicity as a single entity in FIG. 2, in practice the cache controller preferably comprises an embedded microprocessor with separate processing logic for each of send cache 68 and receive cache 70 and one for a completion queue (CQ) context cache 72, described below. The processing logic for each cache comprises appropriate comparators and associated logic needed for carrying out the cache access and management functions.

When the last packet required by a given WQE has been sent, execution unit 52 writes an entry in a local database (LDB) 74. The LDB is shared dynamically by all of the QPs served by execution unit 52 and SDE 54, and holds the entries for each QP in the form of a linked list. TCU 60 reads the entries from the LDB for each QP in sequence in order to write corresponding completion queue elements (CQEs) to completion queues in memory 38, as mandated by the IB specification. For unreliable connections, the CQE can be written immediately, while for reliable connections, the CQE is written only after an acknowledgment is received over the network from the appropriate remote HCA or TCA. To prepare the CQEs, TCU 60 uses CQ context cache 72, which is preferably held in cache memory 66, in addition to the QP context information.

FIG. 3 is a block diagram that schematically illustrates the structure of QP send context cache 68 in memory 66, in accordance with a preferred embodiment of the present invention. The structures of QP receive context cache 70 and CQ context cache 72 are similar, although their contents are different. As shown in the figure and described hereinbelow, cache 68 is an eight-way set-associative cache, consisting of eight tag arrays, identified as tables 80, 82, . . . , 84, each table having one hundred twenty-eight entries 86. Each QP has a QPN that is twenty-four bits long, in accordance with the IB specification, of which the seven least significant bits (LSB) are used as the cache index. The seven LSB are used to select an entry 86 in each of tables 80, 82, . . . , 84. The seventeen most significant bits (MSB) of the QPN are then compared to a tag comprising the seventeen MSB of a target QPN value 88 of the selected entry in each of the tables.

A cache hit occurs when the MSB of the QPN match target 88 in any of the tables. In this case, a pointer 90 provided by the matching table entry 86 indicates an address of a context entry 96 in a data region 94 of cache 68. Controller 73 uses pointer 90 to locate and read out the appropriate context entry, for use in servicing the current WQE or packet.

The inventors have found the arrangement of cache 68, with eight tables 80, 82, . . . , 84 of one hundred twenty-eight entries each, to provide a convenient cache size without requiring excessive logic circuitry for cache checking and management. Alternatively, if context entries 96 are arranged in data region 94 in the same order as entries 86 in tables 80, 82, . . . , 84, pointer 90 may be eliminated, and instead the location of the matching target QPN value 88 may itself be used as the pointer to the appropriate context entry. In alternative embodiments of the present invention, not shown in the figures, the cache may comprise a smaller or larger number of tables, with fewer or greater than one hundred twenty-eight entries. Similarly, although the seven LSB of the QPN serve as a convenient index, other portions of the QPN, or even other related data, may be used as the cache index instead of the seven LSB.

Preferably, context entries 96 comprise only those fields of QP context information 42 from memory 38 that are needed by the elements of HCA 22 to carry out their packet sending and receiving functions. Most of these fields are fixed in advance, typically by the host software that established the QP, and cannot be changed by the HCA. Others are updated by elements of the HCA during processing of packets. These updated values are subsequently copied back to QP context 42 in memory 38 when the cache entry is replaced by a different QP.

Table I below lists a selection of QP context data 90 that are held in QP send (requester) context cache 68. The entries in this list are presented by way of example, and additional items of context data that can advantageously be included in cache 68 will be apparent to those skilled in the art. For each entry, the R/W column indicates whether the field can be written to by elements of the HCA (RW), or whether the field is treated by the HCA as read-only (RO).

TABLE I

QP SEND CONTEXT CACHE FIELDS

| Field name | R/W | Comments |
| --- | --- | --- |
| A | RO | Enable QP for atomic operations |
| W | RO | Enable QP for RDMA write |
| R | RO | Enable QP for RDMA read |
| Port number | RO | Port on which to send outgoing packets and to receive responses via connected services |
| Outstanding reads | RW | Number of outstanding RDMA read requests allowed |
| Receive Q_key | RO | Used for QP access control |
| Last ackreq PSN | RW | Last PSN for which a request was sent requiring acknowledgment |
| RLID | RO | Remote local identifier (LID) - destination data link address (LID) for packets that are sent on this QP, as well as source address of packets received via connected services |
| Next to send PSN | RW | PSN to be assigned to the next packet sent |
| Highest PSN | RW | Used to control packet resend when required |
| RGID | RO | Remote global identifier (GID) - network address of remote node communicating with this QP |
| Descriptor base address | RO | Based address of descriptors 44 in memory 38 for this QP |
| Descriptor Lkey | RO | Access key for descriptors |
| Doorbell page | RO | Used in controlling QP access by host processes, as described in the above-mentioned "DMA Doorbell" patent application |
| SL | RO | IB service level of the QP |
| Peer QP/EE | RO | QPN of peer QP on remote node for connected services, or end-to-end context number (see IB specification) |
| SSQ number | RO | Assignment of the QP to a schedule queue, for scheduling of service by execution unit 52 |
| Send CQ | RO | Completion queue number for this QP |
| LDB head index | RO | Oldest LDB entry for this QP |
| LDB tail index | RW | Newest LDB entry for this QP |

QP receive context cache 70 in memory 66 contains similar elements to send context cache 68 listed in the table above. One significant difference is that the receive information includes pointers to the response database that is used to hold quasi-WQEs generated by the responder flow through HCA 22, in addition to descriptors 44 in memory 38.

Preferably, each table entry 86 in tables 80, 82, ..., 84 also contains a replacement inhibition field 92. This field is used to track which of the entries for a given cache index is in use, or is likely to be in use shortly, and which can be freely overwritten. Preferably, field 92 comprises a locking flag and an in-use flag. The locking flag is preferably set in send cache 68 when necessary, so as to prevent replacement of the corresponding context entry 96. In receive cache 70, however, locking the cache entries may result in blocking of incoming packets at input port 58. Instead, the in-use flag is preferably set in a given table entry 86 when an incoming request has been received on the corresponding QP, so that a quasi-WQE is waiting for service by execution engine 52. Alternatively, other flag configurations and heuristics may be used in field 92.

When cache controller 73 encounters a cache miss, the required QP context entry 96 must be copied from QP context information 42 in system memory 38. One of the entries in the tables, for the given index is overwritten with the new information from memory 38. A table entry 86 in which the locking flag in field 92 is set will not be replaced at this stage. A table entry 86 in receive cache 70 in which the in-use flag in field 92 is set will be replaced only if there are no other table entries with the same index in which the flag is not set. When the in-use flag is set in an entry in send cache 68, the decision on whether to replace the entry depends on the purpose of the replacement.

In normal operation of HCA 22, however, cache hits are generally the rule, rather than the exception. Several factors facilitate this condition:

Execution unit 52 receives WQEs and quasi-WQEs in a sequential chain for each QP, and typically schedules the entire chain for execution in sequence. Therefore, even if there is a cache miss on the first item in the chain, the remaining items are likely to encounter cache hits.

When SDE 54 sends out a request packet, based on a WQE processed by execution unit 52, the network entity to which the packet is sent will generally return a response packet within a short time. While waiting for the response packet, the in-use flag of the corresponding table entry 86 is set. When TCU 60 and RDE 62 receive the response packet for processing, they will thus find the necessary QP context data in cache 66 as part of QP send context cache 68, as a result of execution unit 52 having used the same QP context data shortly beforehand.

By the same token, with respect to QP receive context cache 70, TCU 60 commonly receives multiple request packets in sequence on the same QP from a remote requester. When the packets are RDMA read or atomic requests, the TCU generates chains of quasi-WQEs defining response packets to be prepared by execution unit 52, and sets the in-use flag of the corresponding table entry 86. When the packets are RDMA write requests, the TCU passes the data to RDE 62 for scatter to memory 38. In either case, even if the TCU encounters a cache miss on the first packet in the sequence, the TCU, execution unit and RDE will thereafter find the QP receive context information that they need in the cache.

Figure 4A:
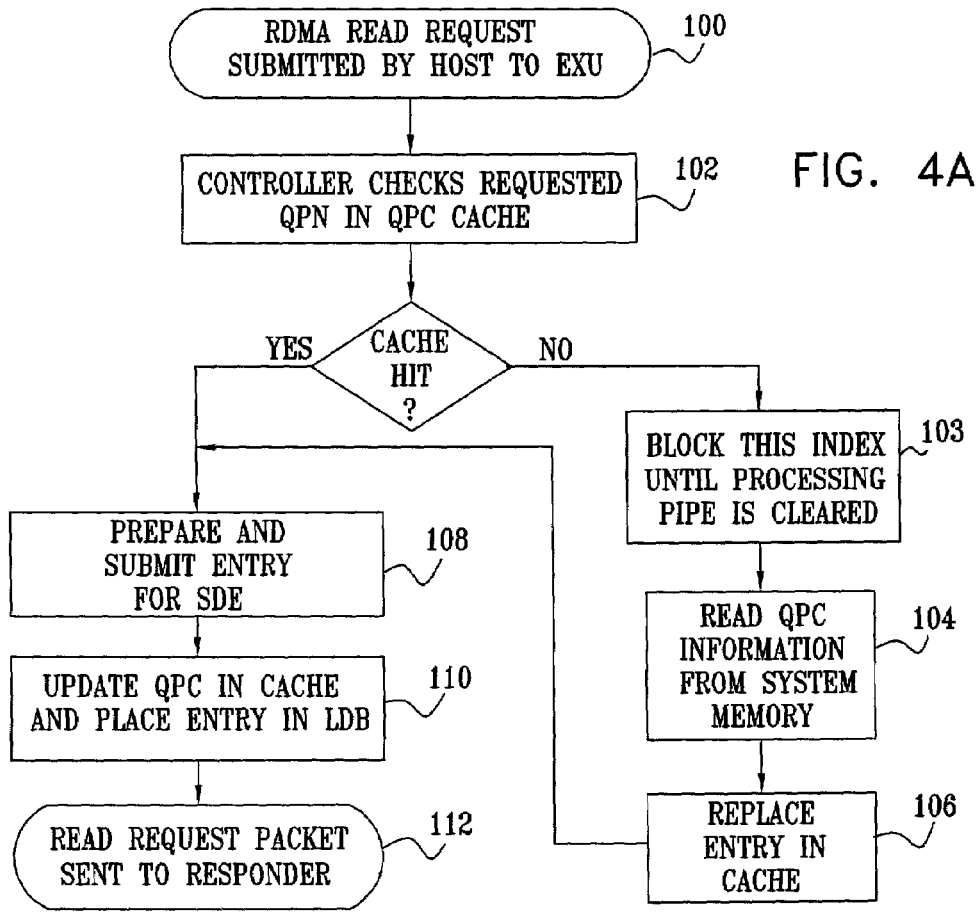
FIGS. 4A and 4B are flow charts that schematically illustrate methods for accessing and updating a QPC cache, in accordance with a preferred embodiment of the present invention.

FIG. 4A is a flow chart that schematically illustrates the operation of execution unit (EXU) 52 in servicing a RDMA read request using send (requester) cache 68, in accordance with a preferred embodiment of the present invention. The RDMA read request is submitted by host 24 in the form of a WQE for a given QP, at a request submission step 100. The host rings one of doorbells 50 assigned to the given QP to alert execution unit 52 that the WQE is ready for processing. The method by which the WQE is preferably submitted and scheduled for execution is described in the above-mentioned related patent applications.

When the doorbell is rung on a given QP, the doorbell handler process of the execution unit asks cache controller 73 to provide the required QP context information. Controller 73 looks up the corresponding QPN in QP send context cache 68, using the seven LSB of the QPN as an index, at a cache checking step 102. If there is no match between the QPN and target field 88 for the index in any of tables 80, 82, ..., 84 (a cache miss), the cache controller blocks the row of tables 80, 82, ..., 84 corresponding to this index, at a blocking step 103. The row remains blocked until the cache controller has finished processing the missed request. This blocking is important in order to avoid situations in which the cache controller provides incorrect information due to a premature cache replacement. Meanwhile, however, cache controller 73 continues to service requests for QP context information in all of the other rows of tables 80, 82, ..., 84, so that cache blocking only rarely delays execution unit 52 in preparing an outgoing packet.

Following a cache miss, after cache controller 73 has flushed its processing pipeline, the controller reads the required information from QP context 44 in memory 38, at a memory reading step 104. It then chooses an unlocked table entry 86 with the same QPN index, to be overwritten with the new information from memory 38, at a cache replacement step 106. Before overwriting QP context entry 96, the read/write fields of this entry, which may have been modified by HCA 22, are copied back to memory 38. The new QPN 88 is then written to the tag field of the chosen table entry 86, and the new QP context entry 96 is entered at the appropriate address in data region 94.

After the cache has been updated, execution unit 52 uses the QP context information in preparing an entry for submission to SDE 54, at an entry submission step 108. Similarly, in the case of a cache hit, cache controller 73 skips steps 103, 104 and 106 and proceeds directly to step 108, using the information already in cache 68. After the entry has been passed to SDE 54 for generation of the corresponding RDMA read request packet, the execution unit updates the appropriate read/write fields in the cache, at a cache update step 110, as illustrated in Table I above. After submitting the last entry to the SDE for a given message, the execution unit also places a database entry in LDB 74, for use by TCU 60 in processing the RDMA read response packet (or packets) that the HCA expects to receive. The read request packet is sent out to the remote responder via output port 56, at a packet sending step 112.

Figure 4B:
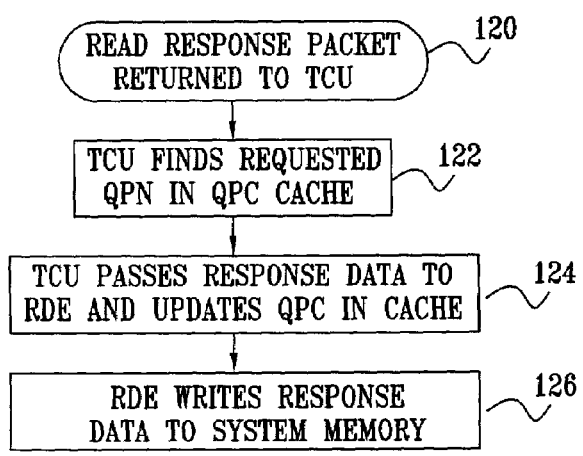

FIG. 4B is a flow chart that schematically illustrates handling of the read response packet that is returned to HCA 22 by the remote responder, in accordance with a preferred embodiment of the present invention. The incoming response packet is passed from input port 58 to TCU 60, at a packet input step 120. For connected services, the transport header of this packet contains the QPN of the requester QP from which the read request packet was sent at step 112, above. When TCU 60 refers the requester QPN to cache 68, it typically encounters a cache hit, at a cache reading step 122. (If for some reason there is a cache miss, cache controller 73 reads the required QP context information from memory 38, as described above at steps 104 and 106.)

TCU 60 uses the context information from the cache to validate the incoming packet, by checking its PSN and access keys. After ascertaining the validity of the packet, the TCU passes the response data to RDE 62, at a data passing step 124. The TCU updates the appropriate read/write fields of QP send context information 68 in cache 66. RDE 62 then writes the response data to memory 38, at a data writing step 126. After the RDE has finished writing the data, a completion engine (preferably part of TCU 60) writes a CQE to the assigned completion queue in memory 38, as well, based on the LDB entry prepared earlier by execution unit 52 and on CQ context information 72.

Although FIGS. 4A and 4B refer specifically to processing of a RDMA read request and its response, the methods of cache access and management exemplified by these figures can be used in a straightforward way for processing other types of requests and responses. More complex modes of cache access and updating can also be applied to context entries 96. For example, cache controller 73 can be used to perform atomic operations on entries 96, such as incrementing context fields and read/modify/write and conditional write operations. More generally speaking, although the preferred embodiments described herein are based on IB conventions and use IB terminology, the principles of the present invention are also applicable to management of context information relating to data packet transport in networks of other types.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A network interface adapter, comprising:
   a network interface, coupled to send and receive data packets over a network;
   a host interface, for coupling to a host processor and to a system memory associated therewith, the system memory containing context information with respect to a plurality of transport service instances used to send and receive the data packets over the network, each of the data packets belonging to a respective one of the service instances;
   packet processing circuitry, coupled between the network interface and the host interface, and adapted to process the data packets using the context information of the respective service instances; and
   a cache memory associated with the packet processing circuitry and coupled to load from the system memory and store the context information of the respective transport service instances for the data packets being processed by the packet processing circuitry.

2. An adapter according to claim 1, wherein the transport services instances have respective instance numbers, and wherein the cache memory comprises one or more tables having entries indicating the context information of the respective transport service instances, indexed by a portion of the service instance numbers.

3. An adapter according to claim 2, wherein the entries comprise respective target fields, corresponding to at least a segment of the service instance numbers of the service instances to which the entries belong, and wherein the target fields are compared to the segment of the service instance numbers of the data packets to determine that a cache hit has occurred, whereupon the packet processing circuitry reads the context information from one of the tables.

4. An adapter according to claim 3, wherein when the cache hit does not occur, the context information is read from the system memory and loaded into the cache memory.

5. An adapter according to claim 2, wherein the portion of the instance numbers comprises a predetermined number of the least significant bits of the instance numbers.

6. An adapter according to claim 2, wherein the one or more tables comprise at least two tables.

7. An adapter according to claim 1, wherein the packet processing circuitry comprises:
an outgoing packet generator, adapted to generate the packets for delivery to remote entities via the network; and
an incoming packet processor, coupled to receive and process the packets from the remote entities via the network,
wherein both the outgoing packet generator and the incoming packet processor are coupled to access the same context information in the cache memory.

8. An adapter according to claim 7, wherein the outgoing packet generator is adapted to generate the packets for delivery to the remote entities responsive both to outgoing requests submitted by the host processor via the host interface and to incoming requests conveyed by the packets received from the remote entities.

9. An adapter according to claim 8, wherein the incoming packet processor is adapted to process both the packets that are received from the remote entities responsive to the outgoing requests conveyed by the packets delivered to the remote entities and the packets that are received from the remote entities conveying the incoming requests.

10. An adapter according to claim 1, wherein the packet processing circuitry comprises a cache controller, which is adapted, responsive to a request from the circuitry to access the context information in the cache memory with respect to one of the service instances, to determine whether a cache hit has occurred, and when the cache hit has not occurred, to read the requested context information from the system memory and load the requested context information into the cache memory in place of the context information of another one of the service instances.

11. An adapter according to claim 10, wherein the context information is organized in the cache memory using a plurality of tables having entries referenced by respective indices, and wherein the cache controller is adapted, while reading the requested context information from the system memory for one of the service instances having a given one of the indices, to block access by the packet processing circuitry to the context information of the service instances having the given one of the indices, while enabling the packet processing circuitry to access the context information of the service instances with other indices.

12. An adapter according to claim 10, wherein the cache controller is adapted, responsive to the request to access the context information, to set a flag with respect to the service instance for which the context information is requested indicating that the context information is in use, and wherein the cache controller is further adapted, upon loading the context information into the cache memory, to store the loaded context information in the cache in place of the context information of another one of the service instances whose flag is not set.

13. An adapter according to claim 1, wherein the context information loaded into the cache memory comprises one or more fields that are updated by the packet processing circuitry in the course of processing the data packets, and wherein the updated fields are copied back to the context information in the system memory after the data packets have been processed.

14. An adapter according to claim 13, wherein the updated fields comprise packet serial numbers of packets processed by the circuitry.

15. An adapter according to claim 1, wherein the context information stored in the cache memory comprises a send cache, containing the context information pertaining to packets generated responsive to requests submitted by the host processor, and a receive cache, containing the context information pertaining to packets generated responsive to requests submitted to the adapter by remote entities over the network.

16. An adapter according to claim 1, wherein the transport service instances comprises queue pairs, which are used to interact with a transport layer of the network.

17. A method for network communications, comprising:
coupling a network adapter having a cache memory between a host processor and a network;
storing context information in a system memory associated with the host processor, the context information relating to a plurality of transport service instances for use in sending and receiving data packets over the network via the adapter, each of the data packets belonging to a respective one of the service instances;
responsive to the use of a subset of the transport service instances to send and receive the data packets, loading into the cache memory the context information relating to the transport service instances in the subset; and
processing the data packets using the adapter based on the context information in the cache memory.

18. A method according to claim 17, wherein the transport services instances have respective instance numbers, and wherein loading the context information into the cache memory comprises using respective entries in one or more tables in the cache memory to provide access to the context information, wherein the entries are indexed by a portion of the service instance numbers.

19. A method according to claim 18, wherein storing the context information comprises storing at least a segment of the respective service instance numbers of the service instances to which the entries belong in respective target fields of the entries, and wherein processing the data packets comprises comparing the target fields to the segment of the service instance numbers of the data packets to determine that a cache hit has occurred, whereupon the packet processing circuitry reads the context information from one of the tables.

20. A method according to claim 19, wherein loading the context information comprises, when the cache hit does not occur, reading the context information from the system memory and loading the information read from the system memory into the cache memory.

21. A method according to claim 18, wherein the portion of the instance numbers comprises a predetermined number of the least significant bits of the instance numbers.

22. A method according to claim 18, wherein storing the context information in the one or more tables comprises storing the context information in at least two tables.

23. A method according to claim 17, wherein processing the data packets comprises both generating some of the packets for delivery to remote entities via the network and processing others of the packets received from the remote entities via the network, using the same context information in the cache memory.

24. A method according to claim 23, wherein generating the packets comprises generating the packets responsive both to outgoing requests submitted by the host processor and to incoming requests conveyed by the packets received from the remote entities, using the context information in the cache memory.

25. A method according to claim 24, wherein processing the packets that are received from the remote entities comprises receiving and processing both the packets returned by the remote entities responsive to the outgoing requests in the packets delivered to the remote entities and the packets that are received from the remote entities conveying the incoming requests, using the context information in the cache memory.

26. A method according to claim 17, wherein loading the context information into the cache memory comprises receiving a request to access the context information in the cache memory with respect to one of the service instances, and upon determining that a cache hit has not occurred, reading the requested context information from the system memory, and storing the requested context information into the cache memory in place of the context information of another one of the service instances.

27. A method according to claim 26, wherein loading the context information into the cache memory comprises organizing the context information in the cache memory using a plurality of tables having entries referenced by respective indices, and comprising, while reading the context information from the system memory for one of the service instances having a given one of the indices, blocking access to the context information of the service instances having the given one of the indices, while allowing access the context information of the service instances with other indices.

28. A method according to claim 26, wherein loading the context information read from the system memory into the cache memory comprises setting a flag with respect to the service instance for which the context information is requested indicating that the context information is in use, and wherein storing the requested context information comprises storing the requested context information in place of the context information of another one of the service instances whose flag is not set.

29. A method according to claim 17, wherein processing the data packets comprises updating one or more fields of the context information in the cache memory, and comprising copying the updated fields back to the context information in the system memory after the data packets have been processed.

30. A method according to claim 29, wherein updating the one or more fields comprises writing to the cache memory packet serial numbers of packets processed by the circuitry.

31. A method according to claim 17, wherein loading the context information comprises loading into a send cache the context information pertaining to packets generated responsive to requests submitted by the host processor, and loading into a receive cache the context information pertaining to packets generated responsive to requests submitted to the adapter by remote entities over the network.

32. A method according to claim 17, wherein the transport service instances comprises queue pairs, which are used to interact with a transport layer of the network.

33. A host channel adapter, comprising:
a fabric interface, coupled to send and receive data packets over a switch fabric;
a host interface, for coupling to a host processor and to a system memory associated therewith, the system memory containing context information with respect to a plurality of queue pairs, each of the data packets belonging to a respective one of the queue pairs;
packet processing circuitry, coupled between the fabric interface and the host interface, and adapted to process the data packets using the context information of the respective queue pairs; and
a cache memory associated with the packet processing circuitry and coupled to load from the system memory and store the context information of the respective queue pairs for the data packets being processed by the packet processing circuitry.

34. An adapter according to claim 33, wherein the packet processing circuitry comprises:
an execution unit, adapted to generate the packets for delivery to remote entities via the network; and
a transport check unit, coupled to process the packets received from the remote entities via the network,
wherein both the execution unit and the transport check unit are coupled to access the same context information in the cache memory.

35. An adapter according to claim 34, wherein the execution unit is adapted to generate the packets for delivery to the remote entities responsive both to work queue entries submitted by the host processor via the host interface and to incoming requests conveyed by the transport check unit to the execution unit, in response to the packets received from the remote entities.

36. An adapter according to claim 35, wherein the transport check unit is adapted to process both the packets that are received from the remote entities in response to the packets sent over the network responsive to the work queue items and the packets that are received from the remote entities conveying the incoming requests.

37. A method for network communications, comprising:
coupling a host channel adapter having a cache memory between a host processor and a switch fabric;
storing context information in a system memory associated with the host processor, the context information relating to a plurality of queue pairs for use in sending and receiving data packets over the fabric, each of the data packets belonging to a respective one of the queue pairs;
responsive to the use of a subset of the queue pairs to send and receive the data packets, loading into the cache memory the context information relating to the queue pairs in the subset; and
processing the data packets using the adapter based on the context information in the cache memory.

* * * * *